United States Patent [19]

Lucking

[11] 4,452,425
[45] Jun. 5, 1984

[54] PLASTIC DIAPHRAGM TAP

[75] Inventor: Anthony J. Lucking, London, England

[73] Assignee: Waddington & Duval Limited, London, England

[21] Appl. No.: 375,355

[22] Filed: May 6, 1982

Related U.S. Application Data

[63] Continuation of Ser. No. 792,576, May 2, 1977, abandoned, said Ser. No. 792,576, is a continuation-in-part of Ser. No. 729,903, Oct. 6, 1976, abandoned, said Ser. No. 729,903, is a continuation of Ser. No. 531,474, Dec. 11, 1974, abandoned.

[51] Int. Cl.³ .................................................. F16K 51/00
[52] U.S. Cl. ..................................... 251/144; 251/342; 220/85 P; 222/518
[58] Field of Search ................ 220/85 P, 64; 251/319, 251/320, 335 A, 342; 92/103 M; 222/182, 510, 518, 559; 239/549

[56] References Cited

U.S. PATENT DOCUMENTS

| 2,661,019 | 12/1953 | Snyder et al. | 251/335 A |
| 2,704,548 | 3/1955 | Ralston | 92/103 M |
| 2,906,430 | 9/1959 | Henchert | 220/85 P |
| 2,914,257 | 11/1959 | Wiant | 239/549 |
| 3,595,445 | 7/1971 | Buford | 251/342 |
| 3,730,224 | 5/1973 | Prisk | 251/144 |
| 3,731,851 | 5/1973 | Rauh | 222/518 |
| 4,034,917 | 7/1977 | Bailey | 239/549 |

Primary Examiner—A. Michael Chambers
Attorney, Agent, or Firm—Wood, Herron & Evans

[57] ABSTRACT

A tap comprising a tubular body open at one end and closed at the other end by a flexible resilient diaphragm. The diaphragm is connected to a valve element arranged to close a valve seat at said one end of the body. The body of the tap is made of a material of lower permeability than that of the diaphragm, and the diaphragm is closed to the atmosphere by a cap or a coating. The edge of the valve element is flush with said one end of the body.

2 Claims, 2 Drawing Figures

PLASTIC DIAPHRAGM TAP

This application is a continuation of U.S. patent application Ser. No. 792,576, filed May 2, 1977; application Ser. No. 792,576 is a continuation-in-part of U.S. patent application Ser. No. 729,903, filed Oct. 6, 1976; and application Ser. No. 729,903 is a continuation of U.S. patent application Ser. No. 531,474, filed Dec. 11, 1974. Application Ser. Nos. 531,474, 729,903 and 792,576 are now abondoned.

This invention relates to taps and in particular to moulded plastic taps.

It is desirable to provide a cheap, easily manufactured tap for use with disposable containers. These containers are particularly popular for supplying liquid such as wine or milk. It has been proposed for this purpose to manufacture plastics taps of the type having a resilient plastics diaphragm which, when pressed, opens a valve to allow the liquid to flow from the container.

The main problem encountered with such plastics taps is that of contamination and decay of the contents of the container.

Such contamination and decay can occur for several reasons. First of all, known taps for this purpose have a valve element which is operable to engage a valve seat which is located at a position at a distance from the outlet of the tap. This means that there is a space between the valve seat and the outlet in which liquid can be retained when the tap is closed by virtue of the surface tension of the liquid. This liquid is then open to atmosphere and can consequently decay and/or become contaminated.

A further cause of decay of the contents of the container arises from the relatively high permeability of the container and tap. This allows air to penetrate the walls of the container and the tap and this can consequently cause decay of the contents. However, recent advances in the technology of the manufacture of the containers, especially if made of laminated plastic, have drammatically improved their permeability properties. For example plastic material used for bags had, only a few years ago, a minimum oxygen penetration of 0.35 c.c.'s of oxygen per 24 hours per 3 liters bag. Material now available only allows about 0.07 c.c.'s of oxygen to penetrate each 24 hours. This has led to a demand for correspondingly lower permeability taps. However, the plastic taps supplied at present have been made of a flexible elastomeric material, one reason for this being to provide a diaphragm which is of a sufficiently flexible and resilient nature to operate the valve element correctly, and the material used has a high permeability.

It is accordingly an object of the present invention to reduce contamination and decay of liquid caused by retention of the liquid in a space adjacent the outlet of the tap.

It is a further object of the invention to reduce decay of liquids caused by air permeating through the walls of the tap.

It is a further object of the invention to provide a cheap plastics tap suitable to be manufactured totally automatically, which is simple to operate and which is particularly suitable for using with containers having contents such as wine or milk and acts to reduce contamination and decay of such contents.

A tap in accordance with the invention comprises a tubular body open at one end thereof to define a fluid outlet, the outlet being provided with a valve seat, a flexible resilient diaphragm closing the other end of the tubular body, a fluid inlet positioned within a wall of the tubular body and between the diaphragm and the outlet, and a valve element connected to the diaphragm and arranged to close the valve seat, the edge of the external surface of the valve element being substantially flush with the tubular body's said one end when the tap is closed, and the resilience of the diaphragm normally retaining the valve element against the valve seat, pressure on the diaphragm causing the valve element to move outwardly of the tubular body and away from the valve seat thereby to open the tap.

The use of a valve element which, when in the closed position, has an outer edge which is substantially flush with the end of the tubular body ensures that there is no "dead space" at the outlet of the tap. The elimination of this dead space means that liquid will not be retained at the outlet by virtue of its surface tension, and therefore obviates contamination and/or decay of such liquid.

According to a further feature of the invention there is provided a tap comprising a tubular body open at one end thereof to define a fluid outlet, the outlet being provided with a valve seat, a flexible resilient diaphragm closing the other end of the tubular body, a fluid inlet, positioned within a wall of the tubular body and between the diaphragm and the outlet, and a valve element connected to the diaphragm and arranged to close the valve seat, the resilience of the diaphragm normally retaining the valve element against the valve seat, pressure on the diaphragm causing the valve element to move outwardly of the tubular body and away from the valve seat thereby to open the tap, wherein the tubular body is made of a relatively low permeability material, and the diaphragm is made of a material which is of relatively higher permeability and more flexible.

The use of a separate diaphragm means that the remaining part of the tap can be made of a low permeability plastics material which will not allow significant permeation of air to cause decay of liquid within the container, whereas the diaphragm can be constructed from a sufficiently flexible and resilient material which will necessarily have a higher permeability. However, the total amount of air which penetrates the tap is considerably reduced as compared with known taps which are wholly formed from flexible, high permeability materials, because the area of the diaphragm exposed to the atmosphere is extremely small compared with the total surface area of the tap.

Furthermore, it is possible to provide a cap which can be positioned over the diaphragm and which is made of a low or non-permeable material so as to further reduce penetration of air. Such a cap can be removed and discarded when the tap is to be used.

In an alternative embodiment, the flexible diaphragm can be coated with a low permeability material such as an epoxy resin or polyvinylidene chloride. Such a coating is impractical on known taps in view of the fact that the whole of the tap must be coated with material, which is costly and fairly difficult to achieve, and that the flexing of the diaphragm would be likely to cause cracking of the coating. This will not occur with the tap of the present invention because the diaphragm is a separate piece and is fairly small.

The body of the tap is preferably of material such as low density polyethylene, high density polyethylene or polypropylene. The valve element may for example be made of high or low density polyethylene. The flexible diaphragm on the other hand will normally be made of ethylene vinyl acetate and the cap to cover the diaphragm may be made of polypropylene or rigid PVC. The cap may be given a metallised finish which can both enhance the oxygen barrier and provide the material of the cap with a decorative finish.

A tap in accordance with the present invention has a very significantly reduced oxygen penetration count. For example it may allow only 0.06 c.c.'s of oxygen to penetrate per 24 hours (compared with values of up to 0.44 c.c.'s for previous plastic taps for the same purpose).

The tap itself is preferably made of three parts; namely, the body, the flexible diaphragm and the valve element. This makes the manufacture of the tap extremely simple.

An embodiment of a tap in accordance with the present invention will now be further described by way of example with reference to the accompanying drawings in which.

Figure 1:
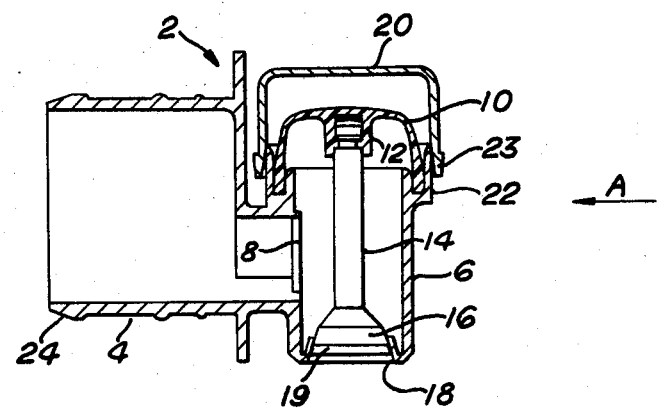
FIG. 1 is a cross section through the tap.
Figure 2:
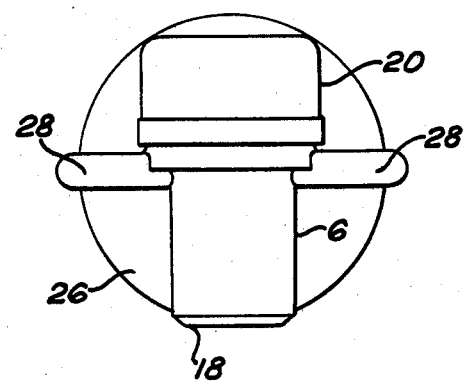
FIG. 2 is a view in the direction of the arrow A of FIG. 1.

Referring to the drawings the tap comprises a body 2 including a tubular inlet portion 4 integrally formed with a tubular body portion 6 made of low permeability material such as high density polyethylene. The interior of the inlet portion is connected via inlet 8 to the interior of the body portion 6.

One end of the body portion 6 is closed by a domed diaphragm 10 which fits around the open end of the tubular body portion and extends upwardly therefrom as can clearly be seen in FIG. 1. The diaphragm, which is resiliently flexible, is made, for example, of ethylene vinyl acetate and is formed with a downwardly projecting socket 12 receiving one end of a shank 14 carrying a valve element 16. The valve shank and element are formed as a single moulding and made for example of high density polyethylene.

The valve element 16 is frusto-conical and is arranged to seat on the edge of a correspondingly tapered outlet 18 so as to close the outlet end of the tubular body portion 6. The outer edge of the external surface of the valve element 16 is flush with the adjacent part of the lower end of the tubular body portion 6 when the tap is closed so that there is virtually no space within which liquid can be retained by virtue of its surface tension. A small seal bead 19 surrounds the element 16 and ensures adequate contact pressure on the valve seat at the outlet 18.

A cap 20 is arranged to be a push fit over an upwardly extending annular shoulder 22 of the body portion 6, the cap, when in position, enclosing the resilient diaphragm 10 and being made of a rigid impermeable material such as polypropylene. The arrangement is such that the tapered end portion 32 of the cap, as it is fitted over the shoulder 22, provides an air-tight fit at the same position as it is resiliently secured to the shoulder. This obviates problems which may occur if the fit is air-tight before the cap is secured, whereby further movement of the cap may cause the pressure of air in the cap to depress the diaphragm and open the tap.

As will readily be appreciated, the tap thus presents a significant barrier to oxygen penetration.

When the tap is to be used the cap 20 is lifted from the flexible diaphragm and when this is depressed by a user the valve element 16 is forced downwardly off its seat 18 to provide an outlet through the bottom of the body portion 6 and communicating with the inlet 8. The tubular inlet portion 4 will normally be forced into a corresponding socket connected to a container or bag or the like containing the liquid to be dispensed and is held within the socket due to the presence of a tapered shoulder 24 at its inner end. A flange 26 then abuts the outer end of the bag socket.

The tap is provided with a pair of finger grips 28 so that these can be held by a user when he presses the diaphragm 10. This prevents a reaction force from being applied to the inlet portion 4 when the tap is operated, which would risk a displacement of the inlet portion within its socket.

In an alternative embodiment, the diaphragm can be structured so that the valve element 16 is retained off the valve seat when the diaphragm is depressed.

We claim:

1. A three part tap for dispensing a commestible liquid such as wine, said tap being connectable to a container for said commestible liquid, said tap comprising a molded tubular tap body open at one end thereof to define a fluid outlet in the form of a valve seat, said valve seat having a generally frusto-conical cross-sectional configuration, said tubular body being fabricated of a relatively low gas permeability plastic material for reducing oxygen penetration through said body into a container connected with said tap, said low permeability tending to reduce contamination and decay of a commestible liquid stored in that container to which said tap is connected, a flexible resilient diaphragm connected to the other end of said body, said body being closed at said other end by said diaphragm, and said diaphragm being fabricated of a relatively high gas permeability material relative to said low gas permeability material in order to provide finger pressure flexibility to said diaphragm, said diaphragm constituting a first part, a tubular inlet molded integral with a wall of said body between said diaphragm end and said outlet end, said section being connectable to said container for connecting said tap to said container, and said section defining a fluid inlet to said body from said container when connected with said container, said body and said section constituting a second part, and a valve element connected by a shank to said diaphragm, said valve element constituting a third part and having a frusto-conical configuration adapted to close said valve seat, finger pressure on said diaphragm allowing the normal resilience of said diaphragm to retain said valve element against said valve seat for closing said tap, the configuration of said valve seat and valve element cooperating so that said valve element self-centers against said valve seat to close said tap in dripless fashion time after time when no finger pressure is exerted on said diaphragm, and said body's outlet and said valve element being structured so that the external edge surface of said valve element extends beyond said body's one end when said tap is open, and retracts back and is substantially flush with said body's one end when said tap is closed, said substantially flush closure position eliminating any external dead space between said valve element and said outlet in which said commestible liquid could be retained by virtue of the surface tension of said liquid, thereby eliminating the accumulation of potentially contaminated or decayed commestible liquid that may adhere to the exterior surface of said body at said outlet after one or more uses of said tap.

2. A tap as set forth in claim 1, said tap comprising a detachable cap made of relatively low gas permeable plastic material and sized to cover said diaphragm, said cap being sufficiently rigid to prevent inadvertent deflection of said diaphragm when said cap is assembled with said tap, and a rim on said body surrounding said diaphragm, said cap being connectable in air tight relation with body on said rim.

* * * * *